P. J. MUELLER.
DRIVING MECHANISM.
APPLICATION FILED JAN. 6, 1911.

989,180.

Patented Apr. 11, 1911.

Witnesses
F. E. Barry
A. R. Walton

Inventor
Peter J. Mueller
by Max A. Schmidt
Attorney.

UNITED STATES PATENT OFFICE.

PETER J. MUELLER, OF MAQUOKETA, IOWA.

DRIVING MECHANISM.

989,180.     Specification of Letters Patent.     Patented Apr. 11, 1911.

Application filed January 6, 1911. Serial No. 601,175.

*To all whom it may concern:*

Be it known that I, PETER J. MUELLER, a citizen of the United States, residing at Maquoketa, in the county of Jackson and State of Iowa, have invented certain new and useful Improvements in Driving Mechanism, of which the following is a specification.

The mechanism which is the subject of the present invention is designed more particularly for use in connection with the driving means of cream separators, although it is not limited to such use; and it consists in a novel construction and arrangement of parts to be hereinafter described and claimed.

It is the object of the invention to provide a simple friction mechanism whereby the driving and driven members may be securely coupled together, and also to provide a structure which permits ready adjustment to take up wear.

In order that the invention may be better understood, reference is had to the accompanying drawing forming a part of this specification, in which drawing—

Figure 1:
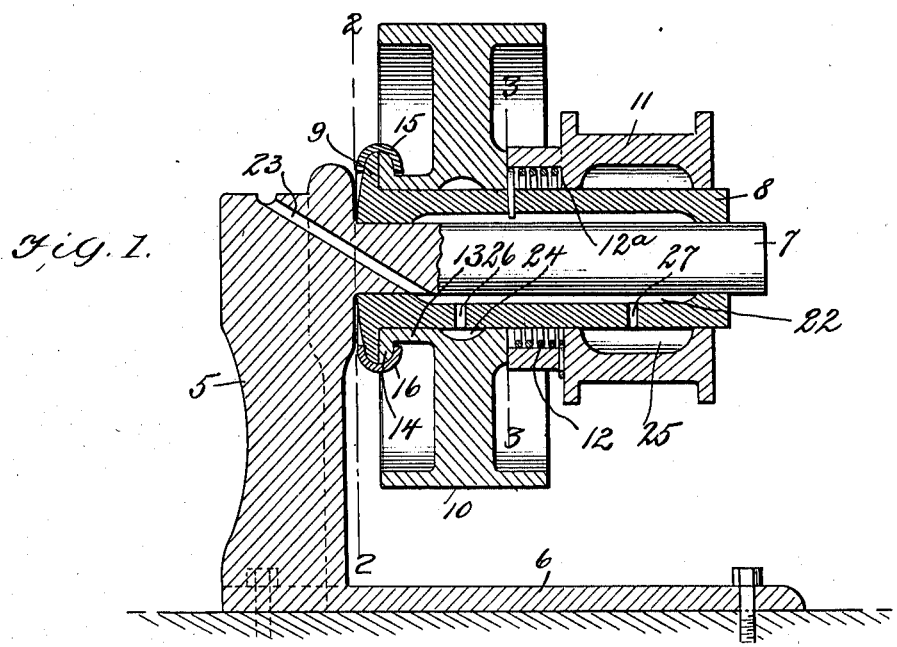
Figure 2:
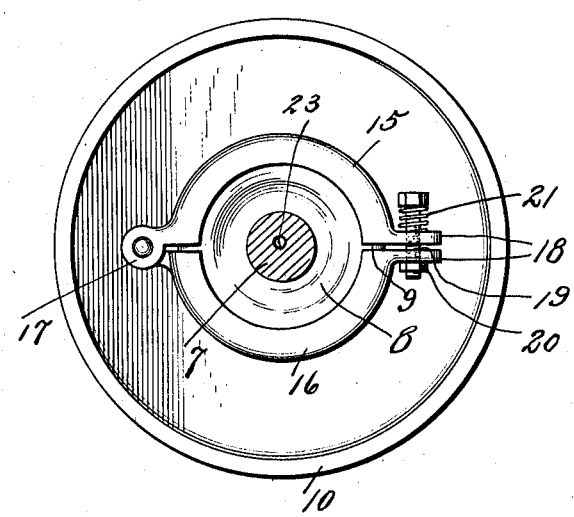
Figure 3:
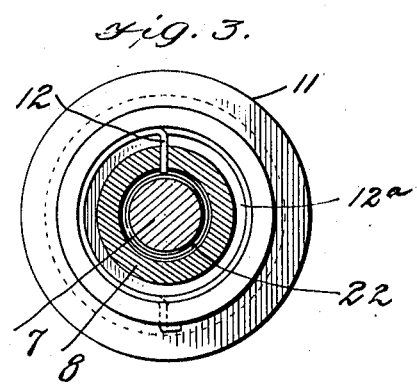

Figure 1 is a central longitudinal section of the mechanism; Fig. 2 is a cross-section on the line 2—2 of Fig. 1; and Fig. 3 is a cross-section on the line 3—3 of Fig. 1.

Referring specifically to the drawing, 5 denotes a stand having a foot or base 6 by which it is secured in place. From one side of the stand extends a stationary spindle 7 which is horizontally disposed, and supports the several parts constituting the clutch mechanism. On the spindle 7 is loosely mounted, so as to be free to rotate thereon, a sleeve 8 having at one of its ends a circumferential outstanding flange 9. On the spindle are also mounted the driving and driven pulleys, the former being indicated at 10, and the latter at 11. The pulley 10 is belted to an engine, or other source of power.

The pulley 11 is connected to the sleeve 8 so that it may rotate therewith. This connection is a yielding one, in order to take up any irregularities in the speed of the engine or other source of power, an internal-combustion engine being, preferably, employed. The yielding connection comprises a spring 12 which is connected at one of its ends of the hub of the pulley 11, and at its other end to the sleeve. The spring is coiled loosely around the sleeve in such a direction that the forward rotation of the sleeve tends to wind the spring up, whereby said motion of the sleeve is transmitted to the pulley 11. The hub of the pulley has a recess 12$^a$ which incloses the spring.

The driving pulley 10 has at one of its ends a short hub extension 13 which is formed with a circumferential outstanding flange 14. This flange is contiguous to the flange 9, and the two flanges are adapted to be clamped together in face-to-face relation, whereby the driving pulley is coupled to the sleeve 8. The clamp for effecting this comprises a ring which encircles the flanges, and is in two sections indicated at 15 and 16, respectively, said sections having a hinge connection 17. At the free ends of the ring sections are outstanding ears 18 having alined apertures through which passes a bolt 19 which is secured by a nut 20, said bolt being provided for drawing the ring sections together around the flanges. Between the bolt-head and one of the ears is interposed a spring 21, said spring being coiled around the bolt, and serving to make the clamping means of the ring sections a yielding one, so that if anything should get between the flanges and the ring sections, the latter can spread. The yielding connection also serves to take up wear of the parts.

The inner periphery of the ring has a channel in which the flanges 9 and 14 fit. The contiguous faces of the flanges are flat, so that they may come closely together, and their outer faces are inclined or beveled in opposite directions, respectively. The opposite walls of the channel of the ring are inclined to conform to the bevel of the outer faces of the flanges, by reason of which said flanges will be jammed tightly together when the ring is tightened around the same, and the driving pulley is thus securely coupled to the sleeve. Wear is readily taken up by contracting the ring by means of the bolt. The only wear is on the ring which will be made of Babbitt-metal so that it can be cheaply replaced when worn out.

In order to provide for the lubrication of the parts, the bore of the sleeve 8 is formed with an oil chamber 22 into which opens a duct 23 leading through the stand 5 from the top thereof. In the hubs of the pulleys 10 and 11 are oil chambers 24 and 25, respectively, and leading thereinto from the chamber 22 are ducts 26 and 27, respectively.

I claim:

1. The combination with a stationary spindle, of a sleeve loosely mounted thereon and having a circumferential outstanding flange, a driving and a driven member, one of said members being connected to the sleeve, and the other member being loosely mounted on the sleeve and having a circumferential outstanding flange contiguous to the first-mentioned flange, and means for clamping the flanges together.

2. The combination with a stationary spindle, of a sleeve loosely mounted thereon and having a circumferential outstanding flange, a driving and a driven member, one of said members being connected to the sleeve, and the other member being loosely mounted on the sleeve and having a circumferential outstanding flange contiguous to the first-mentioned flange, a sectional ring encircling the flanges and having a channel in which the flanges fit, and means for tightening the ring sections around the flanges.

3. The combination with a stationary spindle, of a sleeve loosely mounted thereon and having a circumferential outstanding flange, a driving and a driven member, one of said members being connected to the sleeve, and the other member being loosely mounted on the sleeve and having a circumferential outstanding flange contiguous to the first-mentioned flange, a ring encircling the flanges and having a channel in which the flanges fit, said ring comprising hinged sections having outstanding ears at their free ends, and a bolt passing through said ears for drawing the ring sections together around the flanges.

4. The combination with a stationary spindle, of a sleeve loosely mounted thereon and having a circumferential outstanding flange, a driving and a driven member, one of said members being connected to the sleeve, and the other member being loosely mounted on the sleeve and having a circumferential outstanding flange contiguous to the first-mentioned flange, a sectional ring encircling the flanges and having a channel in which the flanges fit, and yielding means for tightening the ring sections around the flanges.

5. The combination with a stationary spindle, of a sleeve loosely mounted thereon and having a circumferential outstanding flange, a driving and a driven member, one of said members being connected to the sleeve, and the other member being loosely mounted on the sleeve and having a circumferential outstanding flange contiguous to the first-mentioned flange, a ring encircling the flanges and having a channel in which the flanges fit, said ring comprising hinged sections having outstanding ears at their free ends, a bolt passing through said ears for drawing the ring sections together around the flanges, and a spring interposed between the bolt-head and one of the aforesaid ears.

6. The combination with a stationary spindle, of a sleeve loosely mounted thereon and having a circumferential outstanding flange, a driving and a driven member, one of said members being connected to the sleeve, and the other member being loosely mounted on the sleeve and having a circumferential outstanding flange contiguous to the first-mentioned flange, the outer faces of said flanges being beveled, a sectional ring encircling the flanges and having a channel in which the flanges fit, and means for tightening the ring sections around the flanges.

7. The combination with a stationary spindle, of a sleeve loosely mounted thereon and having a circumferential outstanding flange, a driving member and a driven member, one of said members having a yielding connection with the sleeve, and the other member being loosely mounted on the sleeve and having a circumferential outstanding flange, and means for clamping the flanges together.

8. The combination with a stationary spindle, of a sleeve loosely mounted thereon and having a circumferential outstanding flange, a driving member and a driven member, a spring loosely coiled around the sleeve and connected at one of its ends thereto and at its other end to one of the members, the other member being loosely mounted on the sleeve and having a circumferential outstanding flange contiguous to the first-mentioned flange, and means for clamping the flanges together.

In testimony whereof I affix my signature in presence of two witnesses.

PETER J. MUELLER.

Witnesses:
  HARRY PENROSE,
  M. MAHONY.